Jan. 20, 1970 F. L. PAWLOWSKI 3,491,300

FREQUENCY MODULATION DISCRIMINATOR WITH MEANS TO SELECT THE RECOVERY CHARACTERISTIC

Filed March 16, 1967

Inventor

FRANK L. PAWLOWSKI

BY Mueller, Aichele & Rauner

Attys.

United States Patent Office 3,491,300

Patented Jan. 20, 1970

3,491,300

FREQUENCY MODULATION DISCRIMINATOR WITH MEANS TO SELECT THE RECOVERY CHARACTERISTIC

Frank L. Pawlowski, Skokie, Ill., assignor to Motorola, Inc., Franklin Park, Ill., a corporation of Illinois

Filed Mar. 16, 1967, Ser. No. 623,711

Int. Cl. H04b *1/16*

U.S. Cl. 325—349 2 Claims

ABSTRACT OF THE DISCLOSURE

The discriminator includes a transformer having primary and secondary windings axially spaced on an insulating tube, and a pair of magnetic cores. Capacitors in parallel with the windings form resonant circuits which together with a rectifier network convert an FM signal into an audio signal. When the cores are solely within their respective windings, both resonant circuits are tuned to the FM signal's center frequency and the coupling is relatively loose for operation at a given FM bandwidth. Positioning one core partially within both windings, maintains tuning at the center frequency but adopts the circuit for operation at a greater bandwidth.

BACKGROUND OF THE INVENTION

Modern day frequency modulated (FM) radio receivers are designed to receive a radio frequency (RF) signal which is combined with a locally produced oscillatory signal to provide an intermediate frequency (IF) signal. A discriminator provides an audio signal representative of the amplitude and frequency of the FM components in the IF signal by respectively detecting the amount of instantaneous deviation from the IF signal frequency and the rate of deviation therefrom. The discriminator may be of the Foster-Seeley type in which the output voltage is proportional to the instantaneous deviation frequency. The coefficient of proportionality is determined by the slope of the discriminator recovery characteristic which is established by the values of components in the discriminator. In order to provide a given recovered output, the slope should change with the value of the maximum instantaneous frequency deviation.

In each frequency spectrum, the frequency spacing between adjacent channels is established by Federal Communications Commission (FCC) specifications and associated with a given spacing is a maximum allowable instantaneous frequency deviation. For example, the spacing in the ultra high frequency (UHF) band is presently established at 50 kc., and the maximum allowable deviation is ±15 kc. The total frequency spectrum in each band is limited, so that it may be desired to narrow the channel spacing to provide more channels for separate communications. In the very high frequency (VHF) band, for example, the channels have already been split to reduce the channel spacing from 50 kc. to 25 kc. and reduce the maximum allowable instantaneous deviation from ±15 kc., which is termed "wideband" to ±5 kc. which is termed "narrow band."

In order to make the receiver suitable for use with either bandwidth, it has been proposed to provide a method by which the discriminator can be changed from wideband to narrow band so that it is not necessary to obtain a separate receiver when the bandwidth is changed. In the past, this has required complex changes in circuitry where a number of parts must be removed and be replaced by other parts. If the consumer already owned the receiver he would incur a costly changeover by a serviceman or he would have to send the receiver back to the manufacturer which involves expense on either or both of their parts.

SUMMARY OF THE INVENTION

It is, therefore, an object of this invention to provide a discriminator circuit which is simply and inexpensively converted for operation at different bandwidths.

Another object is to provide a discriminator transformer with cores which may be positioned in either of two arrangements depending on whether wide or narrow band operation is desired.

A further object is to provide a discriminator which can be adjusted for use on either narrow or wideband without having to change any of the circuit components therein.

In a particular form of the invention, a discriminator for detecting wideband or narrow band FM components in an intermediate frequency signal includes axially spaced primary and secondary winding on an insulating tube, and first and second magnetic cores associated with respective ones of the windings. A capacitor is connected in parallel with each of the windings to form a pair of resonant circuits. A rectifier circuit coacts with magnetic and electrical coupling between the resonant circuits to convert the FM components into an audio signal, the amplitudes of which are related to the slope of the discriminator recovery characteristic.

The transformer has a first arrangement in which the cores are positioned solely within their respective windings so as to provide minimum coupling between the resonant circuits and thereby cause the slope of the recovery characteristic to be high for narrow band operation. The position of each core is such that the inductance of each winding plus the reflected inductance of the opposite winding exactly resonates with the associated capacitor at the intermediate frequency.

The transformer has a second arrangement in which the first core is partially within both windings which increases the coupling between the resonant circuits to thereby decrease the slope of the recovery characteristic for wideband operation. In this arrangement, the second core is partially extracted from the secondary winding with the resulting decrease in its inductance being compensated for by the first core being partially within the secondary winding. The length of the first core is such as to remain within the primary winding a distance similar to the distance in the first arrangement to provide for a constant inductance in the primary winding. Thus, the inductance of both windings remains the same in order to maintain resonance at the intermediate frequency.

DESCRIPTION OF THE PREFERRED EMBODIMENT

Figures 1, 2, 3, 4:
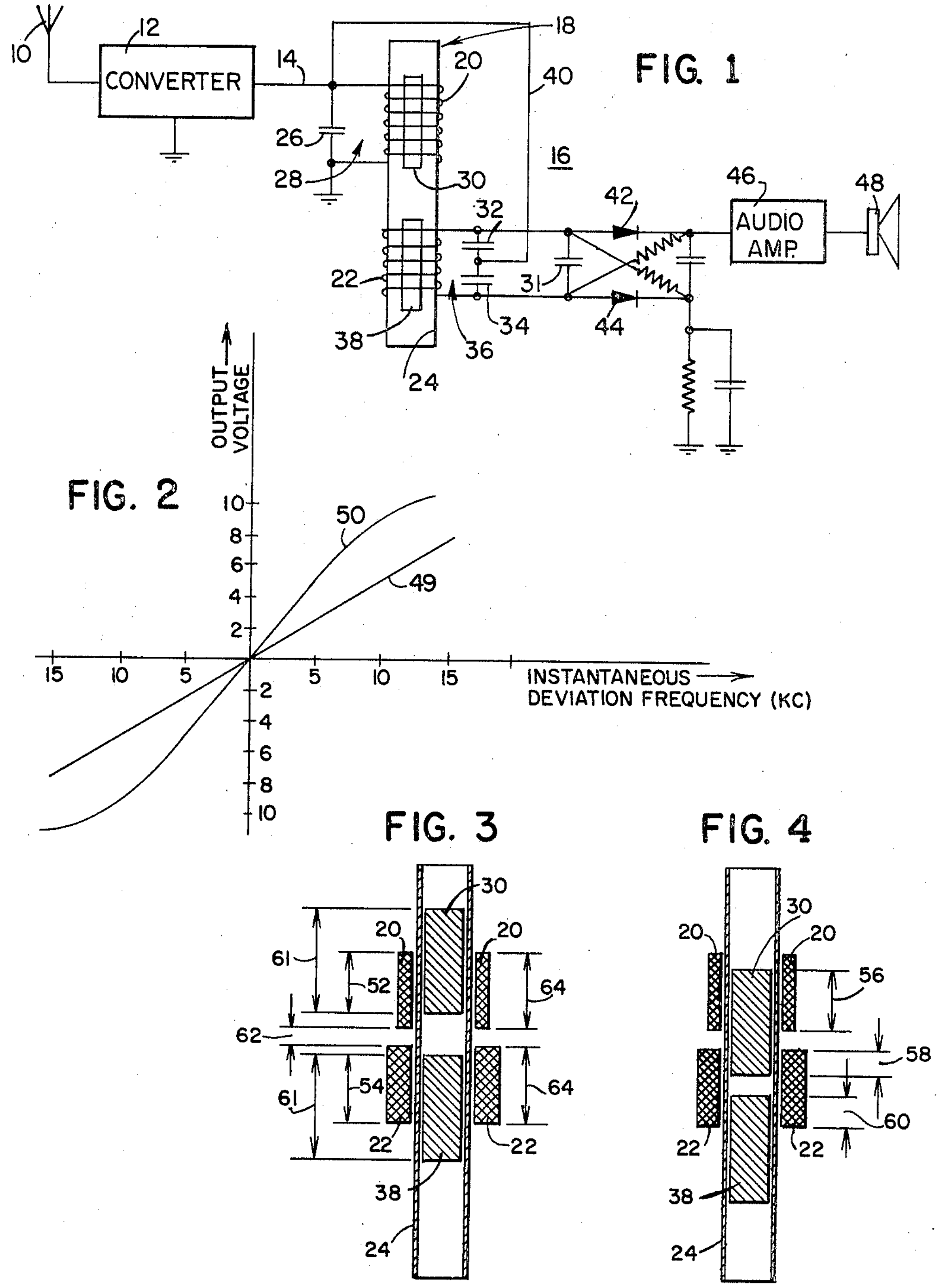
FIG. 1 illustrates a diagram partially schematic and partially in block of a radio receiver incorporating the invention.
FIG. 2 is a graph of the discriminator recover characteristics for narrow and wideband operation.
FIG. 3 illustrates the arrangement of the cores in the discriminator transformer for narrow band operation.
FIG. 4 illustrates the arrangement of the cores for wideband operation.

In the radio receiver of FIG. 1, a frequency modulated RF signal appearing at antenna 10 is applied to a converter 12 which may be of known construction for developing an IF signal of reduced frequency such as 455 kc. on input conductor 14. The RF signal has a carrier frequency with the instantaneous deviation therefrom being indicative of the amplitude of the FM components and with the rate of deviation representing the frequency of the FM components. The converter 12 includes means to select which of the many RF signals at antenna 10 will be reflected as an IF signal on conductor 14.

The frequency modulated IF signal is applied to a discriminator 16 which includes a transformer 18 having axial spaced primary and secondary windings 20 and 22 wound about the exterior surface of a taped insulating tube 24. The primary winding 20 is coupled in parallel with a capacitor 26 to form a parallel resonant circuit 28 connected between input conductor 14 and a point of reference potential and is tuned to the IF signal frequency by a threaded magnetic core 30. The secondary winding 22 of transformer 18 is coupled in parallel with a capacitor 31 and a pair of series connected capacitors 32 and 34 to form a second parallel resonant circuit 36 which is tuned by a magnetic core 38 to the IF signal frequency. The resonant circuits 28 and 36 are magnetically coupled by the action of transformer 18 and are electrically coupled by a lead 40 from input conductor 14 to the junction of capacitors 32 and 34.

The operation of discriminator 16 is explained in Patents No. 2,121,103 issued to Seeley and No. 2,410,983 issued to Koch. As explained in these patents, the electrical and magnetic coupling between the resonant circuits 28 and 36 coact with a pair of rectifier devices 42 and 44 to produce a voltage which changes in amplitude in accordance with the instantaneous deviation from the IF signal frequency and changes in frequency according to the rate of deviation therefrom. The amplitude varying voltage is amplified by audio amplifier 46 and then applied to loudspeaker 48 with the volume of the reproduced sounds being proportional to the amplitude of the voltage and the pitch of the sounds being related to the frequency of the voltage.

The response of discriminator 16 to the IF signal is known as the discriminator recovery characteristic and as shown in FIG. 2, it is a plot of instantaneous deviation frequency versus the discriminator output voltage. The slope of the discriminator recovery characteristic is dependent upon a number of factors, one of which is the degree of coupling between primary winding 20 and secondary winding 22, with an increase in coupling causing a decrease in the slope of the characteristic. For a given makeup of audio amplifier 46 and a given maximum allowable deviation, the optimum slope is fixed and the coupling should be adjusted to obtain such slope.

The spacing between adjacent carrier frequencies and the maximum allowable deviation is fixed by the FCC and differs depending on the particular frequency spectrum. For purposes of illustration, and not as a limitation, it may be assumed that the receiver of FIG. 1 is to respond to a frequency spectrum in the UHF range where the spacing between channels is presently 50 kc. and the maximum allowable deviation is ±15 kc. which is generally considered to be wideband. The curve 49 of FIG. 2 depicts a recovery characteristic for such a deviation with the slope being relatively low by providing tight coupling in the transformer 18. Since the UHF spectrum is limited in overall span, when more frequencies are required in the future, the FCC will reduce the spacing between adjacent channels from 50 kc. to 25 kc. and the maximum allowable frequency deviation will be reduced from ±15 kc. to ±5 kc. For the same makeup of the audio amplifier 46, accurate reproduction will be attained if the slope is increased by three times, that is, if 9 kc. in wideband operation (±15 kc.) yields 6 volts then 3 kc. in narrow band operation (±5 kc.) should also yield 6 volts. Such increased slope may be had by decreasing the coupling of transformer 18 in accordance with this invention to provide a recovery characteristic having the shape of curve 50. In a circuit of practical construction of which the curves of FIG. 2 are illustrative, such 3:1 increase in slope may not be precisely obtainable without distortion unless more expensive, larger and special cores are used. The discrepancy between the actual and desired values may be compensated for by providing slight additional gain in the audio amplifier 46 for narrow band operation.

It is desirable to provide means to effect a change over to narrow band so that the owner of a wideband receiver does not have to buy a new receiver when the bandwidth is changed. The novel means to effect this change will now be explained by reference to FIGS. 3 and 4. It will be noted that a predetermined amount of inductance, as determined by the size of the associated capacitors, is necessary to insure that the resonant frequencies of resonant circuits 28 and 36 are maintained precisely at the IF signal frequency and this inductance must not change in the conversion from wideband operation to narrow band operation if proper detection is to be attained.

FIG. 3 illustrates an arrangement for narrow band operation in which core 30 extends a distance 52 within primary winding 20 as measured from the bottom of the core to the top of the winding. The core 38 extends into the secondary winding 22 a distance 54 as measured from the bottom of the winding to the top of the core 38. The inductance of the winding 20 plus the reflected inductance from secondary winding 22 provides a net primary inductance to resonate with capacitor 26 at the IF signal frequency. Similarly, the inductance of secondary winding 22 plus the reflected inductance from primary winding 20 provides a net secondary inductance which resonates with capacitors 31, 32 and 34 at the IF signal frequency. It will be noted that each core extends only within its associated winding so that magnetic coupling between the two is relatively loose so as to provide the recovery characteristic represented by curve 50 in FIG. 2.

FIG. 4 shows the arrangement for wideband operation in which the core 38 is extracted partially from secondary winding 22, and core 30 is displaced downwardly so that it is partially within secondary winding 22. The core 30 is now in primary winding 20 a distance 56 which is almost equal to distance 52, with the difference between the two distances resulting from a change in the amount of inductance reflected by secondary winding 22. Core 30 is within secondary winding 22 by a distance 58 and core 38 is within secondary winding 22 by a distance 60, the sum of the two being very close to distance 54. The difference is due to a change in the amount of inductance reflected from primary winding 20. Although the net inductances of the respective windings have remained constant during the changeover from narrow band to wideband, and therefore the resonant frequencies have not changed, it will be noted that the degree of coupling has been increased because the primary core 30 is now within both primary and secondary windings. As previously stated, this decreases the slope of the recovery characteristic to provide curve 49 of FIG. 2.

The length 61 (in the embodiment shown, core 38 has the same length) of the core 30 must be very carefully selected, with respect to the spacing 62 between the windings, in order to insure that the distances 52 and 56 are very close to provide a constant net primary inductance and at the same time, in the FIG. 4 arrangement, the core must extend within the secondary winding 22 the precise distance necessary to obtain curve 49. If core 30 is too short, for example, than in the wideband FIG. 4 arrangement, either the coupling will not be sufficient so that the slope will not be low enough to achieve curve 49, or the inductance of primary winding 22 will not be of a value to tune precisely at the IF signal frequency The selection of the length 61 of core 30 is limited by the spacing 62 between the primary and secondary windings 20 and 22 and as can be seen, if the spacing is larger than that shown, for example, the core 30 would have to be longer to provide constant net primary inductance and the desired degree of coupling in the two arrangements. Similarly, the "length" 64 of the windings will affect the selection of the respective core lengths (in the embodiment shown the "length" of the primary and secondary windings are equal) and preferably to insure proper tuning and coupling in both arrangements, core 30 should have a length 61 at least equal to one-half the length 64 of winding 20 plus the spacing 62 between the windings plus an additional amount to insure some insertion in secondary winding 22 in the FIG. 4 arrangement. The number of turns in the primary and secondary windings 20 and 22 will be related to the respective inductances and therefore will also affect the length of the cores 30 and 38.

Also of significance is the permeability of the cores 30 and 38 which is a measure of the change of inductance per turn of the core, and is determined by the core composition, with a higher permeability providing a greater rate of change. In the FIG. 4 arrangement, if the permeability of core 30 is too high, for example, it will extend too deep into winding 22 (distance 58 will be longer), and may overtune winding 22, thus not allowing core 38 to serve its tuning function.

The basic objective is to choose the values of the components of FIG. 1, the size and composition of the cores 30 and 38, and the distance between and the number of turns of windings 20 and 22, in such a way that the net primary and secondary inductances remain constant in either narrow or wideband even though the positions of the cores are changed in order to provide different coupling for narrow and wideband operation. In a practical circuit, the curves of FIG. 2 were obtained with the following values.

| | |
|---|---|
| Winding **20** | 110 turns. |
| Winding **22** | 145 turns. |
| Capacitor **26** | 1,000 micromicrofarads. |
| Core **38** | Material identified as No. 8 (Radio Core, Inc). |
| Capacitor **31** | 80 micromicrofarads. |
| Capacitor **32** | 1500 micromicrofarads. |
| Capacitor **34** | 1500 micromicrofarads. |
| Core **30** | Material identified as No. 13 (Radio Core, Inc). |
| Distance **52** | .28 inch. |
| Distance **54** | .22 inch. |
| Distance **56** | .30 inch. |
| Distance **58** | .10 inch. |
| Distance **60** | .14 inch. |
| Length **61** | .5 inch. |
| Spacing **62** | .09 inch. |
| Length **64** | .34 inch. |

What has been described, therefore, is a novel construction of a transformer in combination with a discriminator which permits switching from narrow to wideband operation by merely changing the arrangement of the transformer cores.

I claim:

1. In a superheterodyne radio receiver for frequency modulated radio frequency signals which have a maximum frequency deviation from the center radio frequency of a first value for a given channel spacing and a second greater value of frequency deviation for a larger channel spacing, which receiver has apparatus for selecting radio frequency signals, a converter system for changing the radio frequency signals into an intermediate frequency signal; a discriminator circuit including in combination, a transformer comprising an insulating tube, axially spaced first and second windings wound around the exterior surface of said tube, the first and second windings each having first and second ends, the second end of the first winding and the first end of the second winding being adjacent one another, and first and second magnetic cores adjustably inserted within the tube, first and second capacitance means respectively connected in parallel with said first and second windings to form a pair of resonant circuits, a rectifier circuit which coacts with magnetic and electrical coupling between said resonant circuits to convert the frequency modulation components into an audio signal the amplitude of which is dependent on the slope of the recovery characteristic of the discriminator circuit, said transformer having a first arrangement in which said first core extends only into said first winding a first distance from the first end thereof selected to furnish a net first winding inductance which resonates with said first capacitance means at the intermediate frequency, said second core in said first arrangement extending only into said second winding a second distance from the second end thereof selected to furnish a net second winding inductance to resonate with said second capacitance means at the intermediate frequency, said first and second cores in said first arrangement providing relatively loose coupling between said windings, whereby the slope of the recovery characteristic of the discriminator circuit is relatively high for detection of the frequency modulation components associated with said given channel spacing, said transformer having a second arrangement in which said second core is within said second winding a third distance from the second end thereof, said first core in said second arrangement extending into said first winding a distance from the second end thereof substantially equal to said first distance in said first arrangement to furnish the same net first winding inductance, said first core having a length to extend into said second winding a distance from the first end thereof which adds to said third distance to be substantially equal to said second distance to furnish the same net second winding inductance, said first core having a length to cause the extension thereof within said first and second windings to increase the coupling between them and thereby reduce the slope of the recovery characteristic of the discriminator to a preselected value for detection of frequency modulation components associated with said larger channel spacing.

2. The radio receiver of claim 1 having an input conductor on which the intermediate frequency signal appears, said first winding comprising a primary winding coupled between said input conductor and a point of reference potential, said second winding comprising a secondary winding of said transformer, said second capacitor means comprising a pair of serially connected capacitors connected across said secondary winding, said input conductor being connected to the junction of said pair of capacitors to form the electrical coupling between said pair of resonant circuits.

References Cited

UNITED STATES PATENTS

| | | | |
|---|---|---|---|
| 2,441,116 | 5/1948 | Mackey | 336—131 |
| 2,631,192 | 3/1953 | Wallin | 336—131 X |
| 2,732,529 | 1/1956 | Reid et al. | 333—78 |
| 2,975,274 | 3/1961 | Mitchell | 329—138 X |
| 3,256,489 | 6/1966 | Rogers | 329—138 |
| 3,319,154 | 5/1967 | Rudge | 323—48 |

ROBERT L. GRIFFIN, Primary Examiner

B. V. SAFOUREK, Assistant Examiner

U.S. Cl. X.R.

325—427, 487; 329—138; 336—131